United States Patent
Degen et al.

(10) Patent No.: US 7,313,545 B2
(45) Date of Patent: Dec. 25, 2007

(54) SYSTEM AND METHOD FOR DETECTING FRAUDULENT CALLS

(75) Inventors: Robert Degen, Parker, CO (US); Philip Mellinger, Ellicott City, MD (US); Duane Ritter, Castle Rock, CO (US); Brian Prendergast, Loganville, GA (US)

(73) Assignee: First Data Corporation, Greenwood Village, CO (US)

( * ) Notice: Subject to any disclaimer, the term of this patent is extended or adjusted under 35 U.S.C. 154(b) by 1278 days.

(21) Appl. No.: 10/092,028

(22) Filed: Mar. 5, 2002

(65) Prior Publication Data

US 2003/0050882 A1 Mar. 13, 2003

Related U.S. Application Data (63) Continuation-in-part of application No. 09/948,729, filed on Sep. 7, 2001, and a continuation-in-part of application No. 10/091,000, filed on Mar. 4, 2002.

(51) Int. Cl.
*G06Q 40/00* (2006.01)

(52) U.S. Cl. .................. 705/39; 379/189; 379/114; 379/145; 235/380

(58) Field of Classification Search .................. None
See application file for complete search history.

(56) References Cited

U.S. PATENT DOCUMENTS

| | | | | |
|---|---|---|---|---|
| 4,317,957 | A * | 3/1982 | Sendrow | 705/71 |
| 5,627,886 | A * | 5/1997 | Bowman | 379/111 |
| 5,655,007 | A * | 8/1997 | McAllister | 379/91.01 |
| 6,094,643 | A | 7/2000 | Anderson et al. | |
| 6,163,604 | A | 12/2000 | Baulier et al. | |
| 6,208,720 | B1 * | 3/2001 | Curtis et al. | 379/114.14 |
| 6,212,266 | B1 * | 4/2001 | Busuioc | 379/189 |
| 6,254,000 | B1 * | 7/2001 | Degen et al. | 235/380 |
| 6,516,056 | B1 * | 2/2003 | Justice et al. | 379/145 |
| 6,947,532 | B1 * | 9/2005 | Marchand et al. | 379/114.14 |

\* cited by examiner

*Primary Examiner*—James Kramer
*Assistant Examiner*—Sara Chandler
(74) *Attorney, Agent, or Firm*—Townsend and Townsend and Crew LLP (57) ABSTRACT

Systems and methods for evaluating transactions to determine if suspicious activities are possibly present. Various methods include providing a reference designator list with information associated with one or more suspicious activities. Using the reference designator list, a first and a second transaction systems are evaluated. Various systems include two or more transaction systems utilizing information from a fraud detection system.

12 Claims, 11 Drawing Sheets

| Field Number | Field Name | Maximum Length | Format | Comments |
|---|---|---|---|---|
| 1 | ANI_Phone | 9 | Numeric | Caller Id - 10 Digits Required |
| 2 | Card_Number | 16 | Numeric | Must Be 16 digits and not blank |
| 3 | ARU_Date | 8 | YYYYMMDD | Authorization Request Date |
| 4 | ARU_Time | 6 | HHMMSS | Military Time. |
| 5 | Amount | | Currency | Amount Requested. No Zero Amounts |
| 6 | DNIS | 4 | Numeric | |
| 7 | Merchant_Number | 20 | Numeric | Merchant associated with the ANI |
| 8 | Approved | 8 | Numeric | A Number If Approved Empty If Rejected |

|  | RECORD 7 | RECORD 8 | RECORD 9 | RECORD 10 |
|---|---|---|---|---|
| 301 | Smart | Jones | Jones | Nielson |
| 303 | Betty | Larry | Larry | Karrie |
| 307 |  | Ed | Edward | Jackson |
| 309 | 3333333333 | 5555555554 | 6666666666 | 1111188888 |
| 311 | 5251 Estes Wy. | 124 Illinois Ave. | 3641 Frederick St. | 867 Indiana Ave. |
| 313 | Kiosk | CS | ATM | Kiosk |
| 317 | 908756 | 765432 | 876543 | 645867 |
| 319 | 01/19/2002 | 01/18/2002 | 01/21/2002 | 01/18/2002 |
| 321 | 4999 | 456 | 2500 | 500 |
| 323 | Dollars | Dollars | Dollars | Dollars |
| 327 | 20 | 20 | 20 | 20 |
| 329 | Smith | Corporation | Corporation | Smith |
| 331 | B. |  |  | B. |
| 333 | John | Sales | Sales | John |
| 337 | 5656565656 | 76543210 | 76543210 | 5678123465 |
| 339 | 1212 Middle East | 50 NY St. | 50 NY St. | 1212 Middle East |
| 341 | BANK | MT | MT | BANK |
| 343 | 765410 | 765432 | 876543 | 765410 |
| 347 | 1/21/2002 | 1/18/2002 | 1/21/2002 | 1/21/2002 |
| 349 | 18746 | 456 | 2500 | 1775 |
| 351 | SA Riyals | Dollars | Dollars | SA Riyals |

| Reference Designator Number | NameLast | NameFirst | Phone | MasterLocationIn | MasterLocationOut | TimeStamp |
|---|---|---|---|---|---|---|
| 000000001 | Alexander (R0) | John (R0) | 7680000000 (R0) | 84604 (R0,R8) | 14850 (R0,R8,R9) | 01/19/2002 |
|  | Corporation (R8) | Sales (R8) | 5555555555 (R0) | 34576 (R9) |  |  |
|  | Jones (R0,R8,R9) | Edward (R0,R9) | 5555555554 (R8) |  |  |  |
|  |  | Ed (R8) | 76543210 (R8,R9) |  |  |  |
|  |  |  | 6666666666 (R9) |  |  |  |
| 000000002 | Nelson (R1,R6) | Jack (R1,R5,R6) | 1111111111 (R1,R2) | 76543 (R1, R2) | 89004 (R1, R2) | 01/19/2002 |
|  | Nelsen (R5) |  | 3333333333 (R1,R4,R7) | 89004 (R4) | SA (R4, R7,R10) |  |
|  | Smart (R1) | Edna (R1) | 1414141414 (R4) | 87600 (R5) | 76500 (R5) |  |
|  |  | Betty (R7) | 1111999999 (R5) | 78950 (R6,R10) | 09876 (R6) |  |
|  | Johnson (R2) | Bob (R2) | 6543897000 (R5) |  |  |  |
|  | Smith (R4) | John (R4) | 1111188888 (R6,R10) |  |  |  |
|  | Fix (R5) | Needmy (R5) | 5467844444 (R6) |  |  |  |
|  | Rose (R6) | Kevin (R6) | 5656565656 (R7) |  |  |  |
|  | Nielson (R10) | Jackson (R10) | 5678123465 (R10) |  |  |  |
| 000000003 | Nelson (R3) | Sally (R3) | 2222222222 (R3) | 865434 (R3) | 000102 (R3) | 01/18/2002 |
|  | Character (R3) | Bert (R3) | 7865786578 (R3) |  |  |  |

FIG. 9

SYSTEM AND METHOD FOR DETECTING FRAUDULENT CALLS

This application is a continuation-in-part of U.S. application Ser. No. 09/948,729 filed on Sep. 7, 2001; and U.S. application Ser. No. 10/091,000 entitled Money Transfer Evaluation Systems and Methods, and filed on Mar. 4, 2002.

BACKGROUND OF THE INVENTION

This invention relates generally to the field of monitoring transaction systems to identify suspicious activity.

Toll free authorization request numbers are typically provided to various merchants. Some merchants share toll free authorization request numbers while other merchants have their own private authorization request numbers. These authorization request numbers are intended to be used by merchants to phone in authorizations when a card fails at the point of sale. Using these numbers allows a merchant to continue with a sale when a given card can not be read electronically.

Unfortunately, fraud sometimes takes place when certain individuals are able to learn these authorization request numbers. These individuals may have computer-generated, stolen or otherwise obtained a potential account number. The individuals use the potential account numbers to call an authorization service, via an authorization request number, in order to ascertain whether the potential account number is authorized for a given dollar amount. These fraudulent calls are often made from home phones, cell phones, pay phones, etc. Once the individuals learn that a potential account number is authorized, they may attempt to use the potential account number on the Internet, in a mail order, in a telephone order, in an in person transaction.

BRIEF SUMMARY OF THE INVENTION

The present invention includes systems and methods for evaluating transactions to determine if suspicious behavior exists. In some embodiments, the systems and methods are used to identify potentially and, in some cases, imminent fraudulent activity, such as that relating to credit card transactions. In other embodiments, the systems and methods provide for sharing information across a plurality of system types to identify suspicious activity.

In one embodiment of the present invention, probable fraudulent activity is determined. An authorization request for a given dollar amount is received at a receiving center from a user. Using a fraud test, it is determined if the authorization request is likely to be indicative of fraudulent activity.

An investigation area is coupled to the receiving center. The investigation area houses a fraud detection processing system. The fraud test can be run at the investigation area on the fraud detection processing system. A determination is made as to whether the dollar amount falls within a certain threshold. This determination can be considered to be a part of the fraud test in one embodiment. If the dollar amount is within a certain threshold, then at the investigation area the fraud test, or further fraud testing, is run on the authorization request to determine if fraudulent activity is likely.

The receiving center communicates to the user whether or not the dollar amount is authorized. This information is obtained when the receiving center communicates with a management center, which in turn communicates with an appropriate bank.

If it is determined at the investigation area that there is a likelihood of fraud, then this is communicated to the bank via the receiving center and the management center. Appropriate action can then be taken.

In one embodiment, the fraud test can comprise determining an originating phone number, wherein the originating phone number is the phone number from which the authorization request originated, and comparing the originating phone number against a good list of legitimate originating phone numbers. If the originating phone number is not matched with a number in the good list, the originating phone number can be compared against a bad list of illegitimate originating phone numbers. If the originating phone number is matched with a number in the bad list, the originating phone number can be flagged as probably related to fraudulent activity. It is also envisioned that the originating phone number can be compared against the bad list before the good list.

The fraud test can also include any one of: determining if at least one other authorization request has a dollar amount equivalent to the dollar amount of the authorization request; determining if the authorization request is for an even dollar amount; determining if the authorization request occurs at a time that falls within one or more red flag time windows; determining if at least one other authorization request occurs within a red flag time of the authorization request; and determining if a given number of authorization request occurs within a given time frame from the same originating phone number.

Various embodiments include methods for evaluating transactions for suspicious activity. Such methods include providing a reference designator list that includes data, or information associated with suspicious activity. In some instances, the data is a subset of information available from a particular transaction system. The reference designator list is used to evaluate transactions occurring on a first and a second transaction system. In some embodiments, additional data, or information, is received from the first transaction system and incorporated into the reference designator list. Some embodiments further include receiving information from the second transaction system and incorporating it into the reference designator list. In particular embodiments, the added information is incorporated into the reference designator list by creating a new reference designator, associating the added information with the new reference designator, and adding the new reference designator to the reference designator list.

In one particular embodiment, the first transaction system is involved in responding to authorization requests, while the other transaction system is involved in money transfers. Such a first transaction system can implement reception of an authorization request, determination of the origin of the authorization request, and comparison of the authorization request with information in a reference designator list.

Various systems in accordance with the present invention include a first and second transaction system associated with a fraud detection system. In some embodiments, the first transaction system can be a credit authorization system, while the second transaction system is a money transfer system.

The summary provides only a general outline of the embodiments according to the present invention. Many other objects, features and advantages of the present invention will become more fully apparent from the following detailed description, the appended claims and the accompanying drawings.

BRIEF DESCRIPTION OF THE DRAWINGS

FIGS. 8a-8b illustrate an exemplary transaction record, where FIG. 8a is the forst portion of the record and FIG. 8b is the second portion of the same record.

DETAILED DESCRIPTION OF THE INVENTION

Particular aspects of the present invention provide systems and methods for monitoring and detecting fraudulent activity. Such fraudulent activity can include, but is not limited to, detecting fraudulent money transfers, fraudulent calls, and/or fraudulent credit card uses. In some embodiments, the fraud is detected by using information derived from a plurality of fraud detection systems. In one particular embodiment, a reference designator list is developed from information obtained from two fraud detection systems. The reference designator list can then be used to search a database associated with a money transfer system to detect prior fraudulent activity, and/or used in a real time situation to detect ongoing fraudulent activity. For example, the reference designator list can be queried in real-time whenever a request is made to a receiving center to request an authorization.

Activity can be identified as suspicious by a variety of systems. Such suspicious activity can then be provided to systems and methods in accordance with the present Invention that maintain a central accessible repository of suspicious activity. The central repository can be used in real-time to evaluate ongoing activity in light of the previously detected suspicious activity to determine if the ongoing activity is illegitimate. Systems and methods useful in identifying suspicious activity can include those disclosed in U.S. patent application No. 10/108,948, entitled Systems and Methods for Monitoring Credit Fraud, and filed on Mar. 27, 2002; U.S. patent application Ser. No. 10/091,000 entitled Money Transfer Evaluation Systems and Method and filed on Mar. 4, 2002; U.S. patent application Ser. No. 10/091,001, entitled systems and Methods for Monitoring Credit Card Transactions, and filed on Mar. 4, 2002. All of the foregoing references are incorporated herein by reference for all purposes.

Other aspects of the present invention provide systems and methods for monitoring authorization requests related to credit card transactions. Some aspects of monitoring authorization requests involve receiving authorization requests at a transaction center, investigating the authorization request, and either approving or denying the authorization request based on the results of the investigation.

As shown in the exemplary drawings wherein like reference numerals indicate like or corresponding elements among the figures, an embodiment of a system according to the present invention will now be described in detail. The following description sets forth an example of a fraud detection system and methodology. The system can be operated on many different computing platforms, and other variations should be apparent after review of this description.

Figure 1:
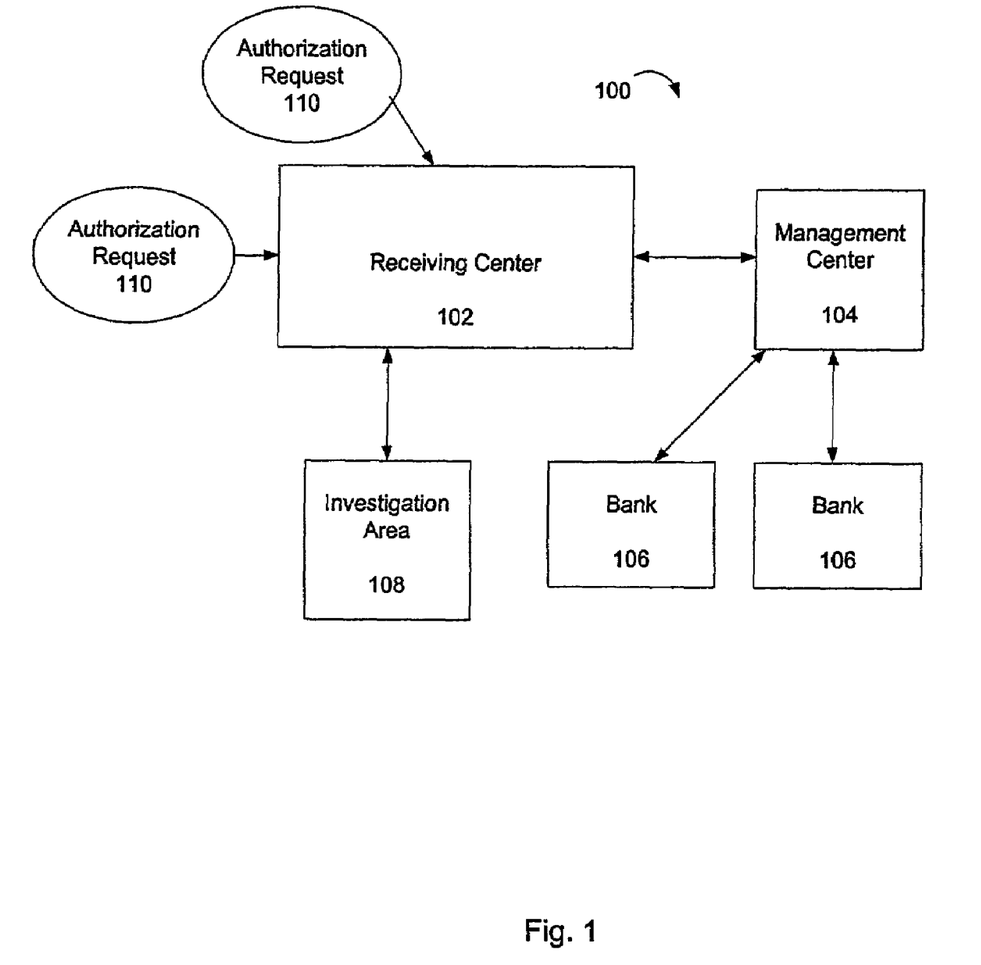
FIG. 1 is one embodiment of a fraud warning system.

Referring to FIG. 1, one exemplary embodiment of a fraud warning system 100 is illustrated. A receiving center 102 for receiving communications from merchants is coupled to a management center 104. The management center is in turn coupled to at least one bank 106. As used herein, the term "bank" refers to a bank, financial institution, credit issuer, credit/charge card company or the like.

In keeping with aspects of the invention, receiving center 102 is coupled to an investigation area 108 that houses a fraud detection processing system. The receiving center can receive authorization requests 110 from users (e.g., merchants, etc.). Such authorization requests are typically received by a telephone call from the merchant. Conveniently, the receiving center may include an interactive voice response unit where all calls may be handled in an automated manner.

Figure 2:
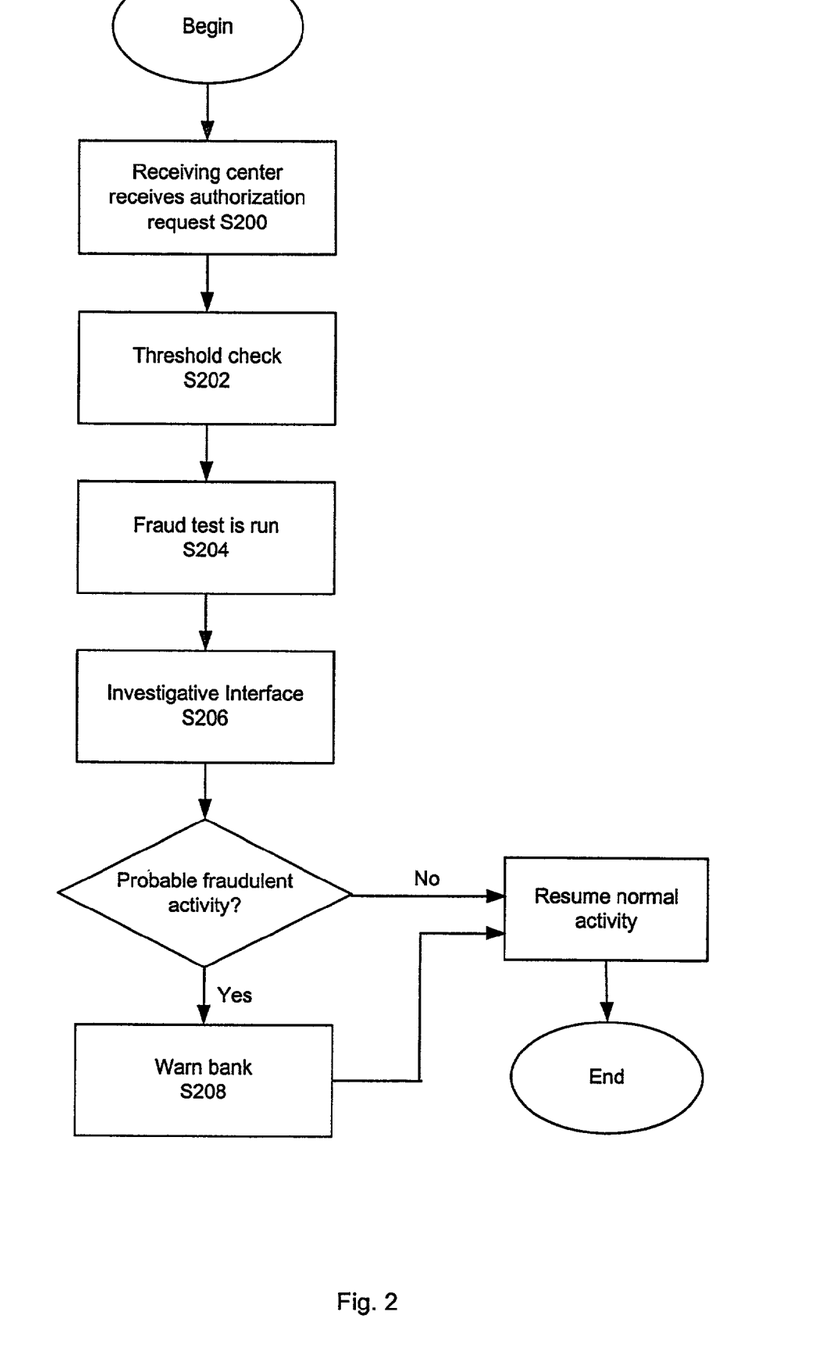
FIG. 2 is a flowchart of one embodiment of a method of determining probable fraudulent activity.

Referring to FIG. 2, in operation, receiving center 102 receives an authorization request for a dollar amount from a user (block S200). At this point, it is communicated to the user as to whether or not the dollar amount is authorized. The authorization request also includes an account number for the credit card and optionally the expiration date. This authorization request is typically but not necessarily in the form of a phone call to a toll free number. However, it is contemplated that other suitable forms of communication, such as computers and networks, can be used as well. Each merchant who subscribes to the subject services is assigned one or more toll free numbers.

As mentioned above, sometimes the criminal element steals or generates these numbers and attempts to commit fraud. The criminals typically make an authorization request for a low amount (usually less than $100) to see if the account number, credit card, etc., is authorized for use. The reason for the criminal element trying to authorize a low dollar amount is so that as much credit is still available as possible. Once the criminals receive authorization they typically use the account number to commit fraud by making a purchase. However, it will be appreciated that fraudulent activity may occur with larger requests, and the invention may be modified to screen these calls as well.

A determination is made as to whether the dollar amount falls within a certain threshold (block S202). This determination can be made at receiving center 102 or investigation area 108. If the dollar amount is within a certain threshold (e.g., $0 to $100), then a fraud test will be run on the authorization request to determine if fraudulent activity is likely afoot. If not, no further fraud testing is done in one embodiment, and the authorization request is processed as normal. In other embodiments, a fraud test may be run on all transactions, or the threshold could be increased, e.g., to $250. In some embodiments, determination of whether the dollar amount is within a certain threshold is part of the fraud test.

A fraud test is run at investigation area 108 (block S204). It should be noted that the aspects of the fraud test can be implemented in software, hardware, manually, or by any suitable combination thereof. The fraud test typically is run in investigation area 108 using the fraud detection processing system. In one embodiment, the fraud test may comprise any combination of the following: determining an originating phone number and comparing it against a good list of legitimate originating phone numbers; determining an originating phone number and comparing it against a bad list of illegitimate originating phone numbers; determining if multiple authorization requests made from the same phone number have equivalent dollar amounts; determining if the authorization request is for an even dollar amount; determining if the authorization request occurs at a time that falls within one or more red flag time windows; determining if at least one other authorization request occurs within a red flag time of the authorization request; determining if a given number of authorization requests occur within a given time frame from the same originating phone number; and the like. Based on this fraud test, it is determined whether there is probable fraudulent activity (block S204).

In one embodiment, the time during which the authorization request 110 came into receiving center 102 is determined and considered. As an example, if the authorization request came into the receiving center at 7:00 a.m. in the time zone of the receiving center, then the next step might be to determine where (including what time zone) the authorization request originated from. One way this might be determined is to look at the area code of the originating phone number. If it is determined that the authorization request came in it was also 7:00 a.m. at the place from which the authorization request originated, then this might not be indicative of fraudulent activity. On the other hand, if the authorization request came in at 5:00 a.m. at the place from which the authorization request originated, then this might be indicative of fraudulent activity.

In another embodiment, the fraud test begins by comparing the originating phone number (or other information indicative of where the authorization request originated from) with a list of known legitimate phone numbers. If the originating phone number is not matched with a number in the legitimate list, the originating phone number is then compared against a list of known illegitimate originating phone numbers. If the originating phone number is matched with a number on the illegitimate list, the originating phone number might be flagged as probably related to fraudulent activity. Additionally, the originating phone number can be added to the illegitimate list.

The call from the originating phone number (or other communication) can be further investigated if the originating phone number was flagged as probably related to fraudulent activity. The originating phone number can be determined in any suitable manner, such as by using a caller ID system as mentioned above. It is also envisioned that the originating phone number (or other information indicative of where the authorization request originated from) can be compared against the illegitimate list before being compared against the legitimate list.

Any suitable method of analyzing the results from above can be used to determine probably fraudulent activity. As used herein, "probable fraudulent activity," "likely to be indicative of fraudulent activity," "probably related to fraudulent activity" and the like refer to a certain threshold of estimated likelihood that the authorization request came from a source having criminal intent (e.g., not an authorized merchant). This threshold can be changed as desired. Moreover, various levels of probable fraudulent activity can be determined if so desired. One possible manner of determining if there exists probable fraudulent activity is to assign weights or points to the results of the various blocks mentioned above.

Further, an investigative interface (e.g., a person) is determined (block S206). This person might query various public and private data bases and conduct proactive investigation (calls the originating phone number in a pretext call) in order to ascertain ownership and control of the phone number. This way the person can verify whether that phone number is related to the merchant account which is involved in the "suspect" transaction which has previously qualified under the fraud search rules as a suspect transaction and as probably being indicative of fraudulent activity. This person, or investigator, then "marks" the transaction and therefore the telephone number (or other authorization request) as good or bad. If it is determined at investigation area 108 that there exists probable fraudulent activity, then this is communicated to the appropriate bank 106 via receiving center 102 and the management center (block S208). Thus, bank 106 is warned that further fraud is imminent. Appropriate action can then be taken, such as performing a more thorough investigation and contacting the authorities and the fraud victim.

Figure 3A:
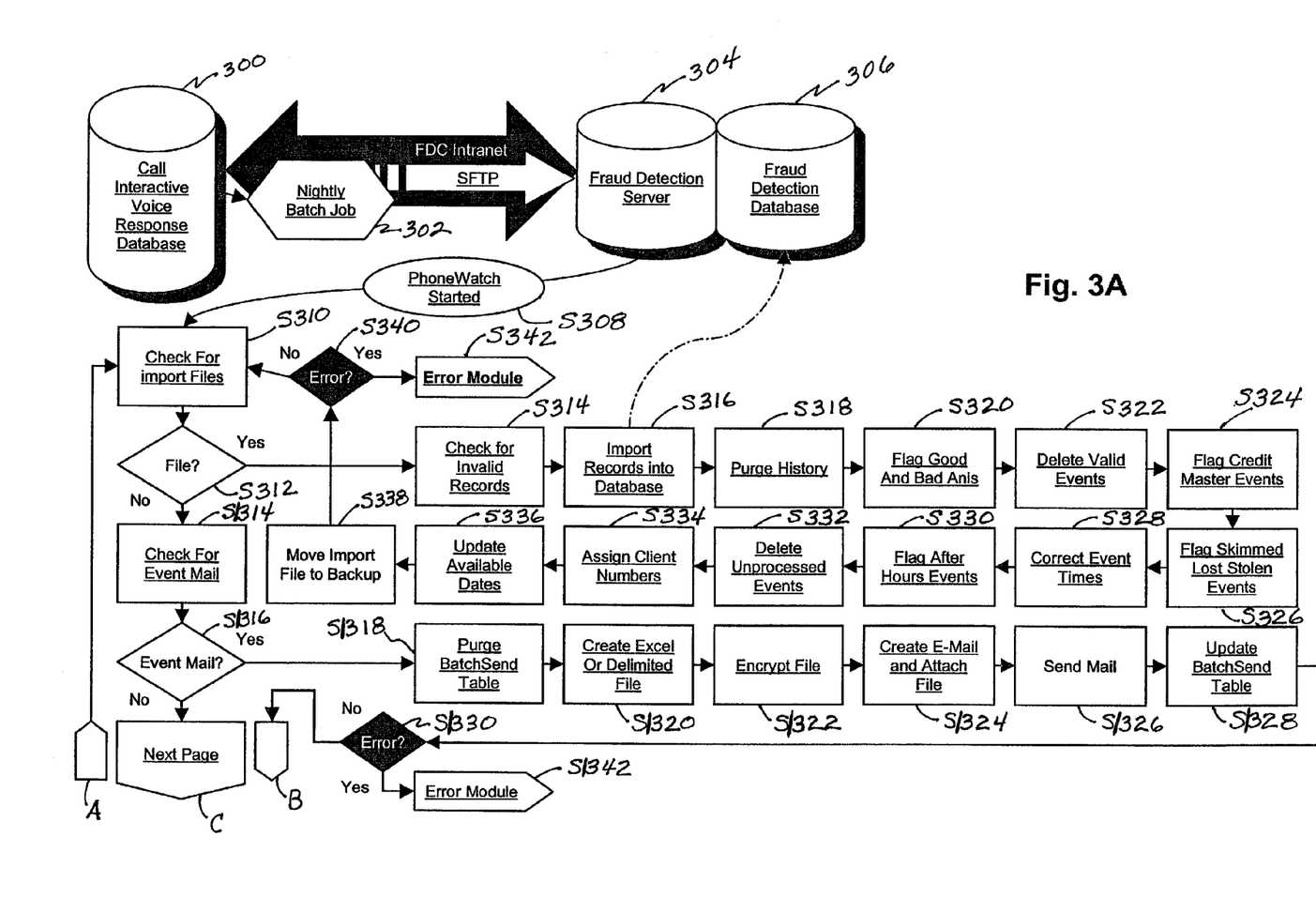
FIG. 3A is a flowchart describing a server process.
Figure 3B:
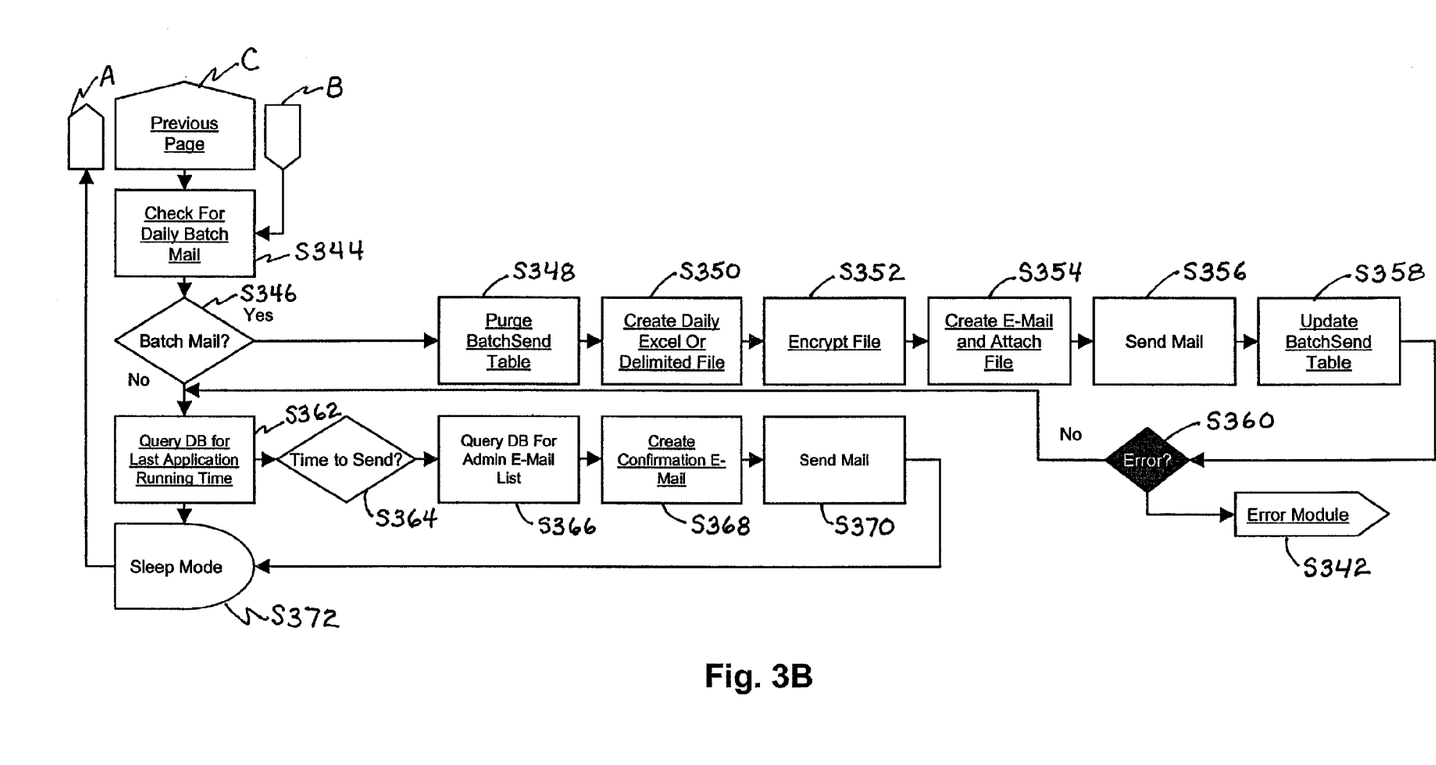
FIG. 3B is a continuation of the flowchart of FIG. 3A.

FIGS. 3A and 3B are flow diagrams of a process according to embodiments of the present invention. The call interactive voice response database 300, which can be within the receiving center 102, can send nightly batch jobs 302 that contain data related to the authorization requests 110. The data is transferred via SFTP to a Fraud Detection Server 304, which is coupled to a Fraud Detection Database 306.

Periodically, a fraud detection process is started; i.e., a fraud test is run (block S308). Fraud warning system 100 then checks for import files (block S310). In one embodiment, at approximately every minute with the exception of the hours between 1:00 a.m. and 3:00 a.m. when backups and file transfers are taking place, fraud warning system 100 checks for new import files at a pre-determined directory of Fraud Detection Server 304. If multiple files are present, fraud warning system 100 will process them one at a time. If no files are present, fraud warning system 100 continues on to the next task in the loop. If a file is present (block S312), then fraud warning system 100 checks for invalid records (block S314). The field values can be checked for invalidity based on a validation number assigned to the field. A count of the invalid and valid records is taken and stored. Records that pass the data cleansing process are imported into the database running on the Fraud Detection Server 304 (block S316).

In one embodiment, all historical caller ID or event origin phone number (or "ANI") records with an update date of 180 days from the current date, whether good or bad, can be removed or purged from an ANI table (block S318). All historical records from a Raw Data Table with an authorization request (or "ARU") date over 180 days can be deleted.

Following the purge, all incoming records are checked against the ANI Table to determine if the incoming event ANI has already been identified as good or bad. Then the good and bad ANI are flagged (block S320). If the ANI is good then the record is removed from the Raw Data Table. If, on the other hand, it is a known bad ANI (or "KBA") then it is categorized as such. Once a record is flagged as KBA, then in some embodiments, it will not be deleted by another process.

In one embodiment, if the total events per credit master ID (e.g., the first six digits of a credit card number, or "BIN") is two or less and the time span between them is less than two minutes and it is the same card number and it is not marked KBA, then the calling event is most likely valid. If an event is determined to be valid, it can be deleted from the Raw Data Table (block S322). The logic is that if a card number is entered incorrectly the first time, a second event will show up for the same card shortly thereafter.

In one embodiment, if the total number of calls per BIN is greater than two, and the card numbers match for the first twelve digits, and the time between calls is less than or equal to five minutes, and the ANI is the same, then the event is categorized as credit master (or "CRM"). This type of activity suggests card numbers were automatically generated and possibly in the form of an automated dialing system. These credit master events are flagged (block S324).

Flagging skimmed lost stolen (or "SLS") events (block S326) requires sorting the current Raw Data by ANI and comparing the area code of the incoming records with the area codes of KBA's previously identified. This can be done because certain area codes statistically have a higher rate of fraud associated with them, and therefore generate more consistent matches for this particular type of activity. The count of events must also be greater than or equal to a given number (e.g., three) for each ANI.

Once this first subset of records has been selected, they can be looped through and a second subset of data can be created for each ANI keyed by BIN. This is run through another loop that checks to see if within this subset the BIN numbers are different, the amounts are within, for example, five cents of each other and the time of the calls were within, for example, five minutes of each other. Each time these requirements are met, a count is incremented by one. If after processing all the records in the ANI subset this count is greater than or equal to, for example, all events for that ANI and associated BIN's are categorized as SLS.

All event times can be saved in a certain time zone, e.g., Central Time Zone where fraud warning system 100 is located. Then, a calculation can be made based on the ANI's area code to determine the correct time of the event (block S328).

Following the corrected event time, fraud warning system 100 can check the event time to see if the transaction took place at an odd hour for the ANI local. If the event hour is between, for example, 3:00 a.m. and 5:00 a.m., then it may be categorized as AFH (block S330). In one embodiment, this categorization may be left out of the process.

At this point, the remaining uncategorized records are theoretically valid and of no interest. These unprocessed events are purged from the Raw Data Table (block S332). The events that remain in the Raw Data Table can be assigned client numbers, or reference designations as discussed later (block S334). The client number can be determined by taking the first six digits of the card number, or the BIN. Alternatively, the client number can be the ANI.

In order for events to be selected from a client interface, the last server import process appends the current import files' date(s) to the available dates table (block S336). This import file may then be moved to backup (block S338). Then, fraud warning system 100 can run a check to find errors, if any (block S340). If there is no error, then the process returns to check for import files (block S310). Otherwise, the process goes to the error module (block S342). If there is a nonfatal error, then a system administrator is notified. If there is a fatal error, then the process stops.

If no file is present (block S312), then event mail is checked (block S1314). Event mail is similar to a batch file but contains information for only one bad AM. If there is an event mail (block S1316) then a BatchSend Table is purged (block S1318). Continuing on, there is an option to create either an Excel or a delimited file (block S1320) which allows clients to use data themselves. Then the file is encrypted (block S1322), an E-mail is created (block S1324), and the file is attached to the E-mail and sent (block S1326) to the client or other designee based on client-provided information. The BatchSend Table is then updated (block S1328). Then an error check is run as before (block S1330). If there is no error, it returns to B. If an error is found, the process goes to the error module (block S1342).

Turning now to FIG. 3B, a check is done for daily batch mail (block S344), because the mail may be in the form of a batch file containing information related to multiple events instead of a single event. The process then runs as before, with blocks S346 to S360 corresponding with blocks S1316 to S1328, respectively.

If there is no batch mail, then the database is queried for the last application running time (block S362). If it is time to send an E-mail to the administrators to let them know fraud warning system 100 is still up and running, then the database is queried for the administrators E-mail list (block S366). The confirmation E-mail created (block S368) and sent (block S370). Then fraud warning system 100 can enter a sleep mode for a predetermined period of time (block S372), and later return to check for import files (block S310).

Figure 4:
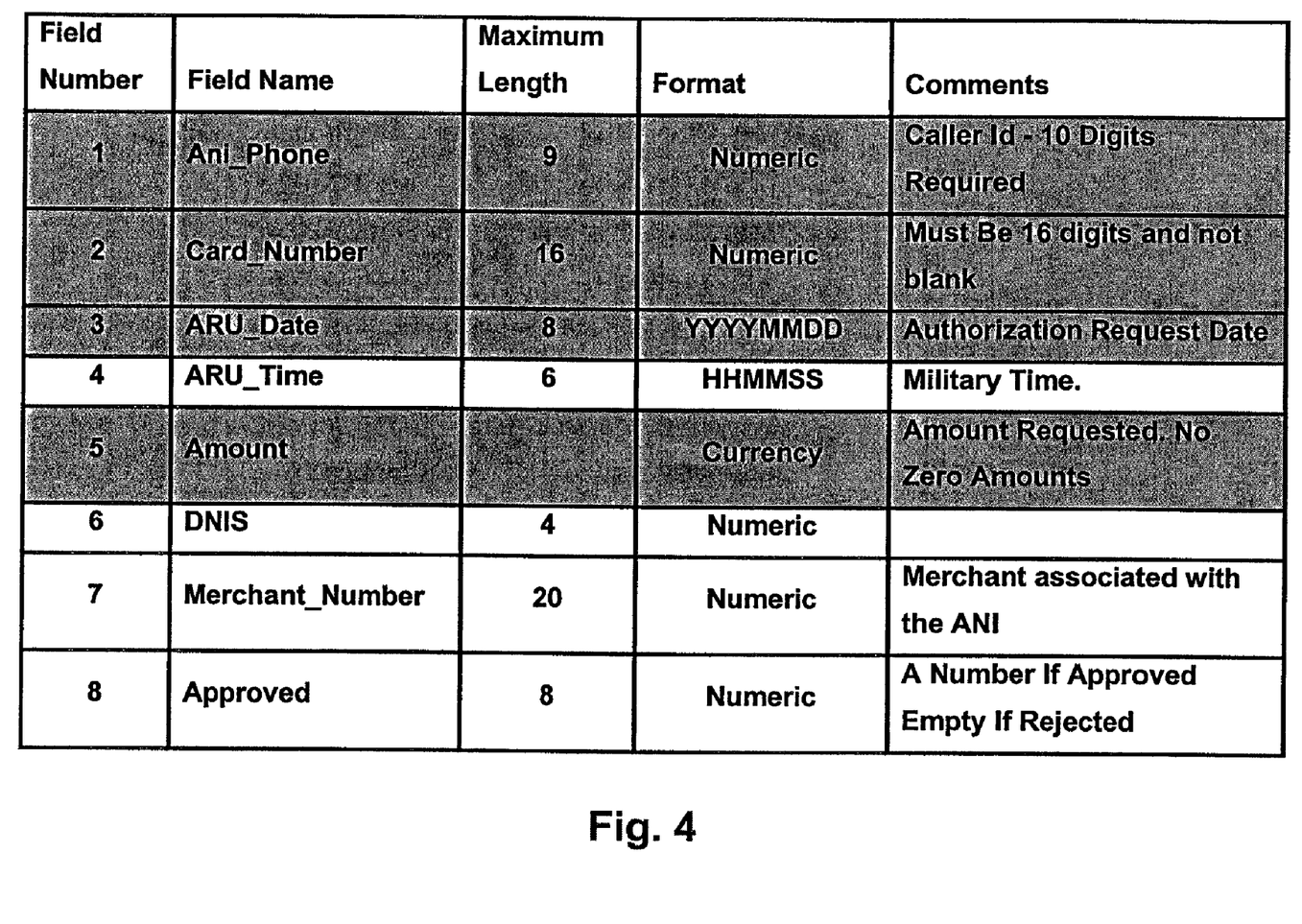
FIG. 4 shows the fields used by an export file.

FIG. 4 shows fields included in the fields used by an export file. The nightly batch job 302 generates these fields. These fields contain data related to the authorization requests. These fields include: the Caller ID phone number, the card number, the authorization request date, the time of the authorization request, the dollar amount requested, the DNIS, the merchant number, and the approval number, if any.

Figure 5:
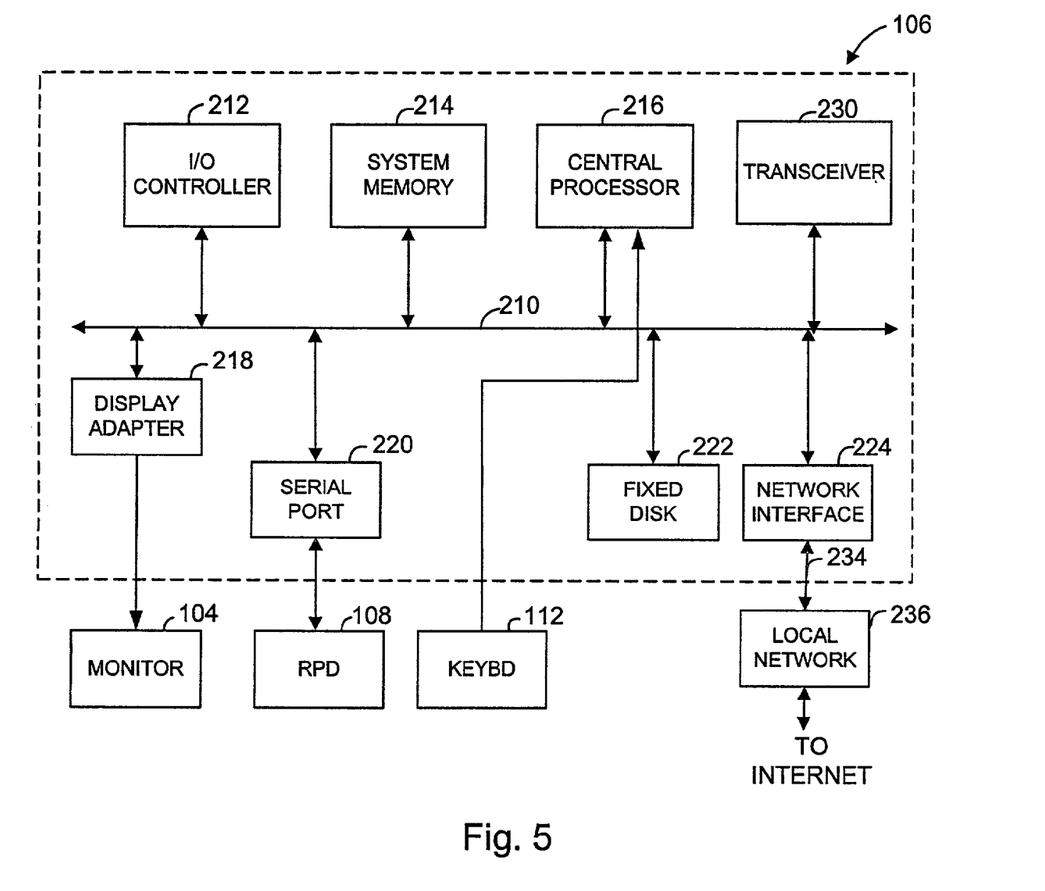
FIG. 5 illustrates subsystems of an exemplary computer system for use with the present invention.

FIG. 5 illustrates subsystems found in one exemplary computer system that can be used in accordance with embodiments of the present invention. Computers can be configured with many different hardware components and can be made in many dimensions and styles (e.g., laptop, palmtop, server, workstation and mainframe). Thus, any hardware platform suitable for performing the processing described herein is suitable for use with the present invention. This hardware can be used, for example, in investigation center 108 for analyzing information to determine if fraudulent activity is likely.

Subsystems within are directly interfaced to an internal bus 210. The subsystems include an input/output (I/O) controller 212, a system random access memory (RAM) 214, a central processing unit (CPU) 216, a serial port 220, a fixed disk 222 and a network interface adapter 224. The use of the bus allows each of the subsystems to transfer data among the subsystems and, most importantly, with CPU 216. External devices can communicate with CPU 216 or other subsystems via bus 210 by interfacing with a subsystem on bus 210.

FIG. 5 is illustrative of one suitable configuration for providing a system in accordance with the present invention. Subsystems, components or devices other than those shown in FIG. 5 can be added without deviating from the scope of the invention. A suitable computer system can also be achieved without using all of the subsystems shown in FIG. 5. Other subsystems such as a CD-ROM drive, graphics accelerator, etc., can be included in the configuration without affecting the performance of system 100 included in the present invention.

One embodiment according to the present invention is related to the use of an apparatus, such as the computer system, for implementing a simulator according to embodiments of the present invention. CPU 216 can execute one or more sequences of one or more instructions contained in system memory 214. Such instructions may be read into memory 214 from a computer-readable medium, such as fixed disk 222. Execution of the sequences of instructions contained in memory 214 causes CPU 216 to perform the process blocks described herein. One or more processors in a multi-processing arrangement may also be employed to execute the sequences of instructions contained in the memory. In alternative embodiments, hard-wired circuitry may be used in place of or in combination with software instructions to implement the invention. Thus, embodiments of the invention are not limited to any specific combination of hardware circuitry and software.

The terms "computer-readable medium" and "computer-readable media" as used herein refer to any medium or media that participate in providing instructions to CPU 216 for execution. Such media can take many forms, including, but not limited to, non-volatile media, volatile media and transmission media. Non-volatile media include, for example, optical or magnetic disks, such as fixed disk 222. Volatile media include dynamic memory, such as memory 214. Transmission media include coaxial cable, copper wire and fiber optics, including the wires that comprise bus 210. Transmission media can also take the form of acoustic or light waves, such as those generated during radio frequency (RF) and infra-red (IR) data communications. Common forms of computer-readable media include, for example, a floppy disk, a flexible disk, a hard disk, magnetic tape, any other magnetic medium, a CD-ROM disk, DVD, any other optical medium, punch cards, paper tape, any other physical medium with patterns of holes a RAM, A PROM, an EPROM, a FLASH-EPROM, any other memory chip or cartridge, a carrier wave, or any other medium from which a computer can read.

Various forms of computer-readable media may be involved in carrying one or more sequences of one or more instructions to CPU 216 for execution. The bus carries the data to memory 214, from which the processor retrieves and executes the instructions. The instructions received by the memory can optionally be stored on fixed disk 222 either before or after execution by the processor.

Many subsystem configurations are possible. FIG. 5 is illustrative of but one suitable configuration. Subsystems, components or devices other than those shown in FIG. 5 can be added. A suitable computer system can be achieved without using all of the subsystems shown in FIG. 5.

As presented, FIGS. 1-5 illustrate embodiments for evaluating credit card authorization activity to identify suspicious and/or fraudulent activity using fraud warning system 100. In accordance with other embodiments of the invention, detection of suspicious and/or fraudulent activity can be coordinated between two or more transaction systems. Thus, as an example, fraud warning system 100 can be utilized in conjunction with information obtained from a money transfer system, or the like. As an illustration, FIGS. 6-9 illustrate an embodiment of the present invention where fraud warning system 100 is used in conjunction with a money transfer system. It should, however, be recognized that any two or more systems can be used in accordance with the present invention. Thus, among others, two money transfer systems, two fraud warning systems 100, two credit card monitoring systems, two cellular phone evaluation systems, or a combination thereof can be monitored in accordance with the present invention.

Figure 6:
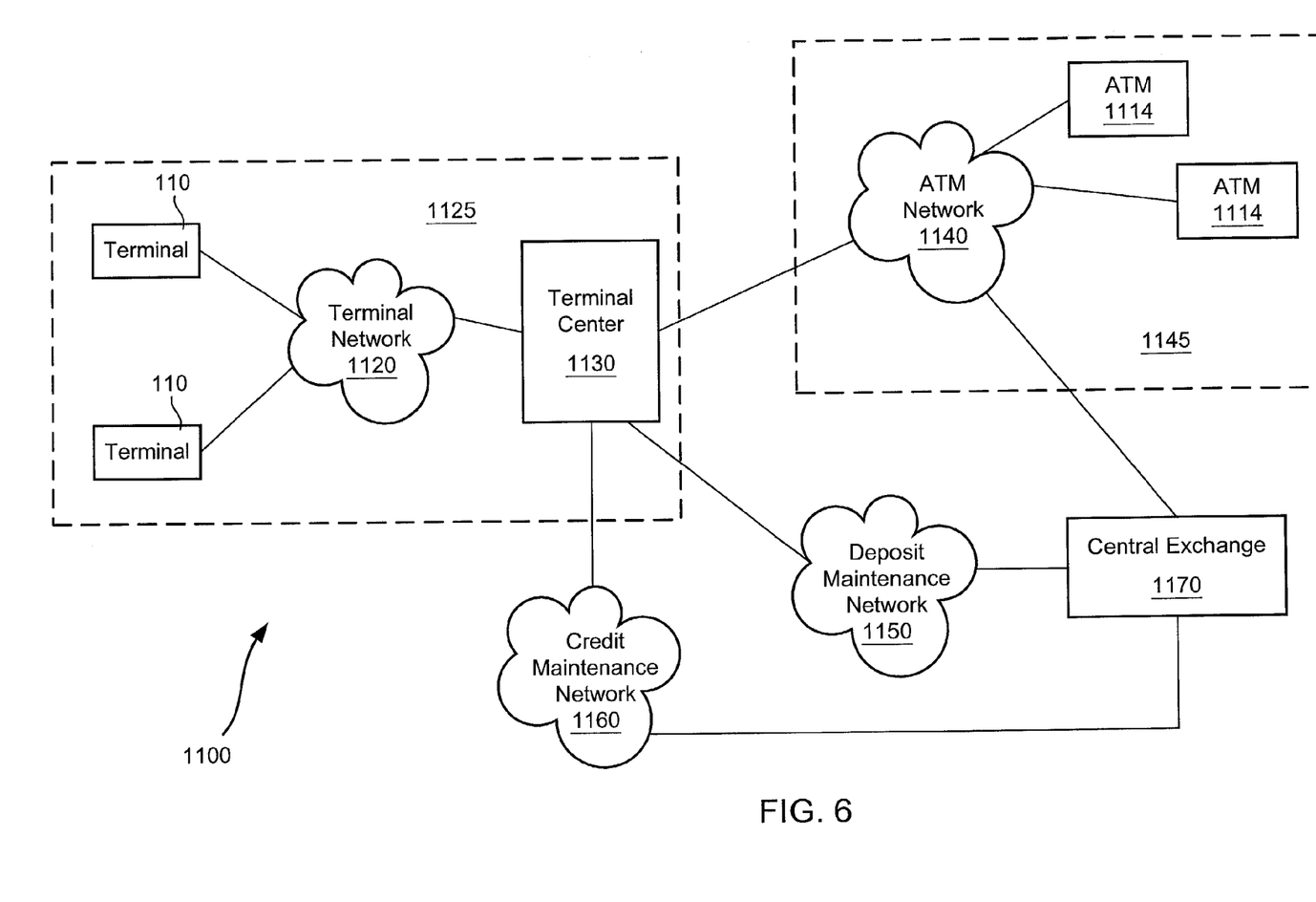
FIG. 6 illustrates a money transfer system that can be evaluated in accordance with embodiments of the present invention.

Referring to FIG. 6, a money transfer system 1100 is comprised of an interface system 1125, an automatic teller system ("ATM") system 1145, a deposit maintenance network 1150, a credit maintenance network 1160 and a central exchange 1170. Interface system 1125 is communicably coupled to ATM system 1145 via an ATM network 1140, deposit maintenance network 1150 and credit maintenance network 1160. In general, interface system 1125 unifies a variety of transfer systems while supporting a variety of mechanisms for introducing and receiving information to and/or from money transfer system 1100.

Interface system 1125 comprises a transaction center 1130 and one or more terminals 1110 in communication via a transaction network 1120. Transaction network 1120 can be any communication network capable of transmitting and receiving information in relation to a transfer of value from one entity to another. For example, transaction network 1120 can comprise a TCP/IP compliant virtual private network (VPN), the Internet, a local area network (LAN), a wide area network (WAN), a telephone network, a cellular telephone network, an optical network, a wireless network, or any other similar communication network. In particular embodiments, transaction network 1120 provides message based communications between terminals 1110 and transaction center 1130.

Terminals 1110 can be any terminal or location where value is accepted and/or provided in relation to money transfers across money transfer system 1100. Thus, in some instances, terminal 1110 is a convenience store where a clerk can receive value from a sender and initiate transfer of the value to a receiver via money transfer system 1100. In such cases, the clerk can typically also provide transferred value to a receiver.

In other instances, terminal 1110 is an automated system for receiving value from a sender for transfer via money transfer system 1100 and/or for providing value to a receiver that was transferred via money transfer system 1100. To accommodate various different payment instruments and types, terminal 1110 can include a variety of interfaces. For example, terminal 1110 can include a mechanism for receiving cash, credit cards, checks, debit cards, stored value cards and smart cards. Such terminals may also be used at the payout end to print a check or money order, or to credit a cash card or stored value card. Examples of such terminals are described in copending U.S. patent application Ser. No. 09/634,901, entitled "POINT OF SALE PAYMENT SYSTEM," filed Aug. 9, 2000 by Randy J. Templeton et al., which is a nonprovisional of U.S. Prov. Appl. No. 60/147,899, entitled "INTEGRATED POINT OF SALE DEVICE," filed Aug. 9, 1999 by Randy Templeton et al, the complete disclosures of which are herein incorporated by reference.

In yet other instances, terminal 1110 is a personal computer operated by a sender of value. Such a terminal can be communicably coupled to transaction center 1130 via the Internet. The terminal can further include a web browser capable of receiving commands for effectuating transfer of value via money transfer system 1100.

Terminal identification information can be associated with each terminal 1110. Such identification information includes, but is not limited to, a physical location, a telephone number, an agent identification number, a terminal identification number, a security alert status, an indication of the type of terminal, a serial number of a CPU, an IP address, the name of a clerk, and the like.

Using money transfer system 1100, value can be transferred from any of a number of points. For example, value can be transferred from terminal 1110 to itself or any other terminal 1110, from any terminal 1110 to a deposit account via deposit maintenance network 1150 or credit maintenance network 1160, from any terminal 1110 to any ATM 1114 via ATM network 1140. Many other transfers to/from ATMs 1114, deposit accounts, terminals, and/or credit accounts can be accomplished using money transfer system 1100.

Figure 7:
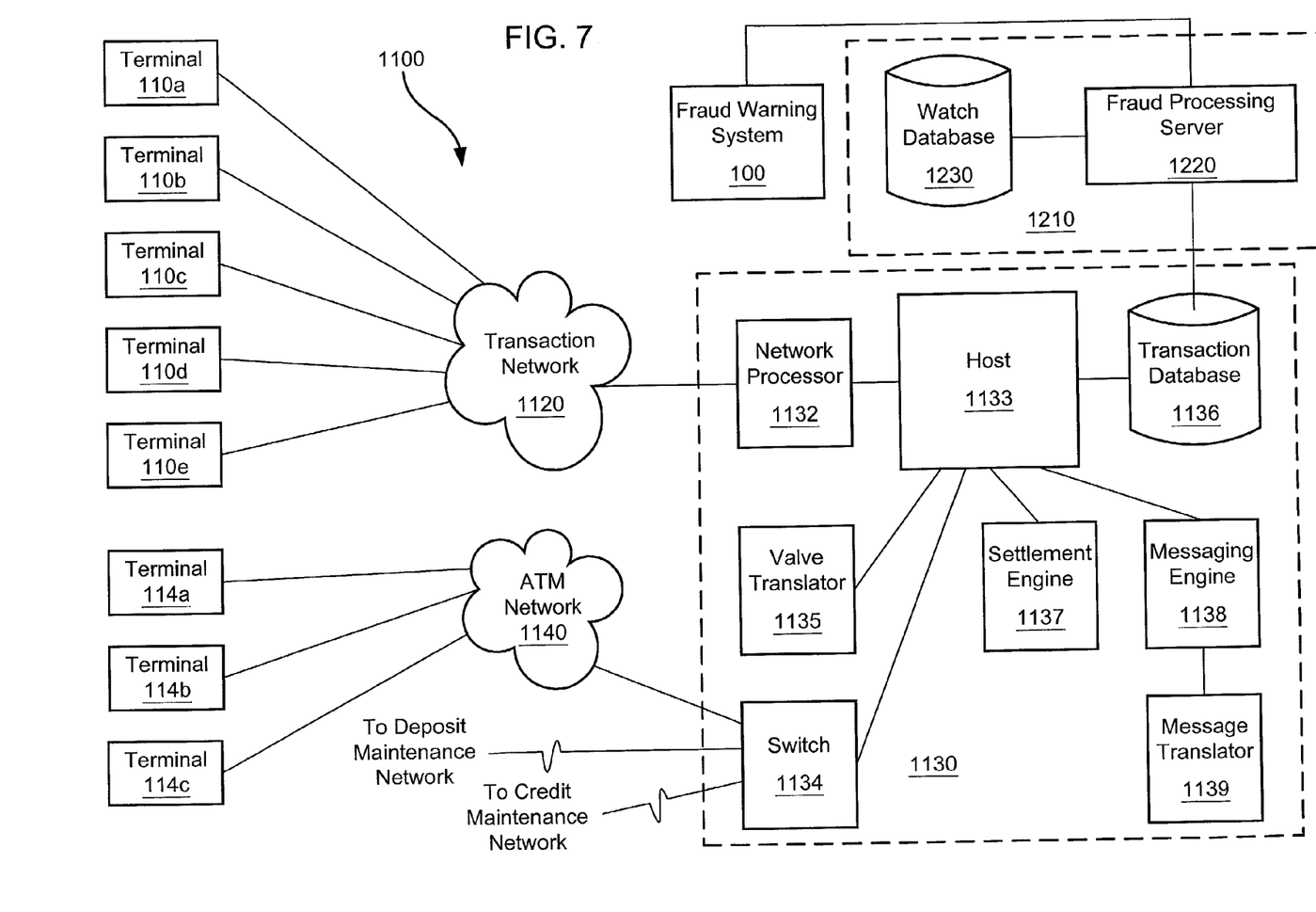
FIG. 7 illustrates a fraud watch system in accordance with an embodiment of the present invention.

Referring to FIG. 7, a fraud watch system 1210 is provided in communication with transaction center 1130 of money transfer system 1100, and with fraud warning system 100. Thus, according to some embodiments of the present invention, fraud detection information developed in fraud warning system 100 can be utilized to detect suspicious money transfers proceeding on money transfer system 1100 and, in converse, fraud detection information developed in association with money transfer system 1100 can be utilized to detect suspicious authorization requests handled by fraud warning system 100.

As illustrated, transaction center 1130 includes a network processor 1132 to process data received and transmitted via transaction network 1120. Data to/from network processor 1132 is available to a host 1133 that may communicate with one or more of a value translator 1135, a transaction database 1136, a settlement engine 1137 and a messaging engine 1138 to perform functions associated with transferring value via money transfer system 1100. In turn, messaging engine may communicate with a message translator 1139. The received and/or provided by transaction center 1130 may include information on the sender, information on the recipient, identification information associated with a terminal 1110, the type and amount of value transferred, a desired location to transfer the value, and the like. In some cases, a value translator 1135 may be used to change the type of value. For example, value translator 1135 may do a foreign currency conversion, or may transfer from one type of value to another, e.g. frequent flyer miles to United States' Dollars. All information that is processed may conveniently be stored in transaction database 1136.

Settlement engine 1137 may be used to facilitate the crediting and debiting of various accounts during a transfer. For example, if a sender requests that funds from a credit card account be used in the transfer, settlement engine 1137 is used to contact credit maintenance network 1160 to charge the card and to manage the fees involved in the transaction. Such fees may be those charged by the credit organization as well as internal fees that are a part of the money transfer transaction. Settlement engine 1137 may be used in a similar manner when crediting or debiting checking accounts, stored value accounts, customer loyalty points and the like.

Once a value transfer is properly processed, data indicating the transfer is sent by a switch 1134 to the appropriate network as shown. This may be to ATM network 1140, deposit maintenance network 1150 and/or credit maintenance network 1160 to complete the transaction.

Fraud watch system 1210 includes a fraud processing server 1220 and a watch database 1230. Fraud watch system 1210 is associated with transaction system 1130 in a manner that allows for access to transaction database 1136. Such association can be provided by direct wired communication between transaction database 1136 and fraud processing server 1220, by direct or network communication between transaction center 1130 and fraud processing server 1220, or by any other mechanism that provides fraud watch system 210 with access to transaction database 1136. In one particular embodiment, fraud processing server 1220 is communicably coupled to transaction network 1120 and accesses transaction database 1136 via network processor 1132 and host 1133. In another embodiment, fraud processing server 1220 is directly coupled to host 1133 and accesses transaction database 1136 via host 1133. It will be recognized by one of ordinary skill in the art that a number of other mechanisms exist within the scope of the present invention for providing access by fraud processing server 1220 to transaction database 1136.

Fraud processing server 1220 can be any microprocessor based device capable of retrieving data from transaction database 1136, searching and manipulating the data, maintaining a form of the data on watch database 1230, and providing access to data on database 1230. Such access to the data can include formatting the data and providing the data in an easily accessible form. In some embodiments, fraud processing computer is a single computer, such as a personal computer or a database server. In other embodiments, fraud processing server is a group of two or more computers. In such embodiments, fraud processing computer can include a central computer associated with one or more peripheral computers. Such peripheral computers can be personal computers or portable devices, such as lap top computers and/or personal digital assistants. In a particular embodiment, fraud processing server 1220 includes a SQL server, while in other embodiments, it includes an ORACLE server.

Fraud processing server 1220 includes a computer readable medium capable of maintaining instructions executable to perform the functions associated with fraud processing server 1220. The computer readable medium can be any device or system capable of maintaining data in a form accessible to fraud processing computer 1220. For example, the computer readable medium can be a hard disk drive either integral to fraud processing server 1220 or external to the server. Alternatively, the computer readable medium can be a floppy disk or a CD-ROM apart from fraud processing server 1220 and accessible by inserting into a drive (not shown) of fraud processing server 1220. In yet other alternatives, the computer readable medium can be a RAM integral to fraud processing server 1220 and/or a microprocessor (not shown) within the server. One of ordinary skill in the art will recognize many other possibilities for implementing the computer readable medium. For example, the computer readable medium can be a combination of the aforementioned alternatives, such as, a combination of a CD-ROM, a hard disk drive and RAM.

Figure 8A:
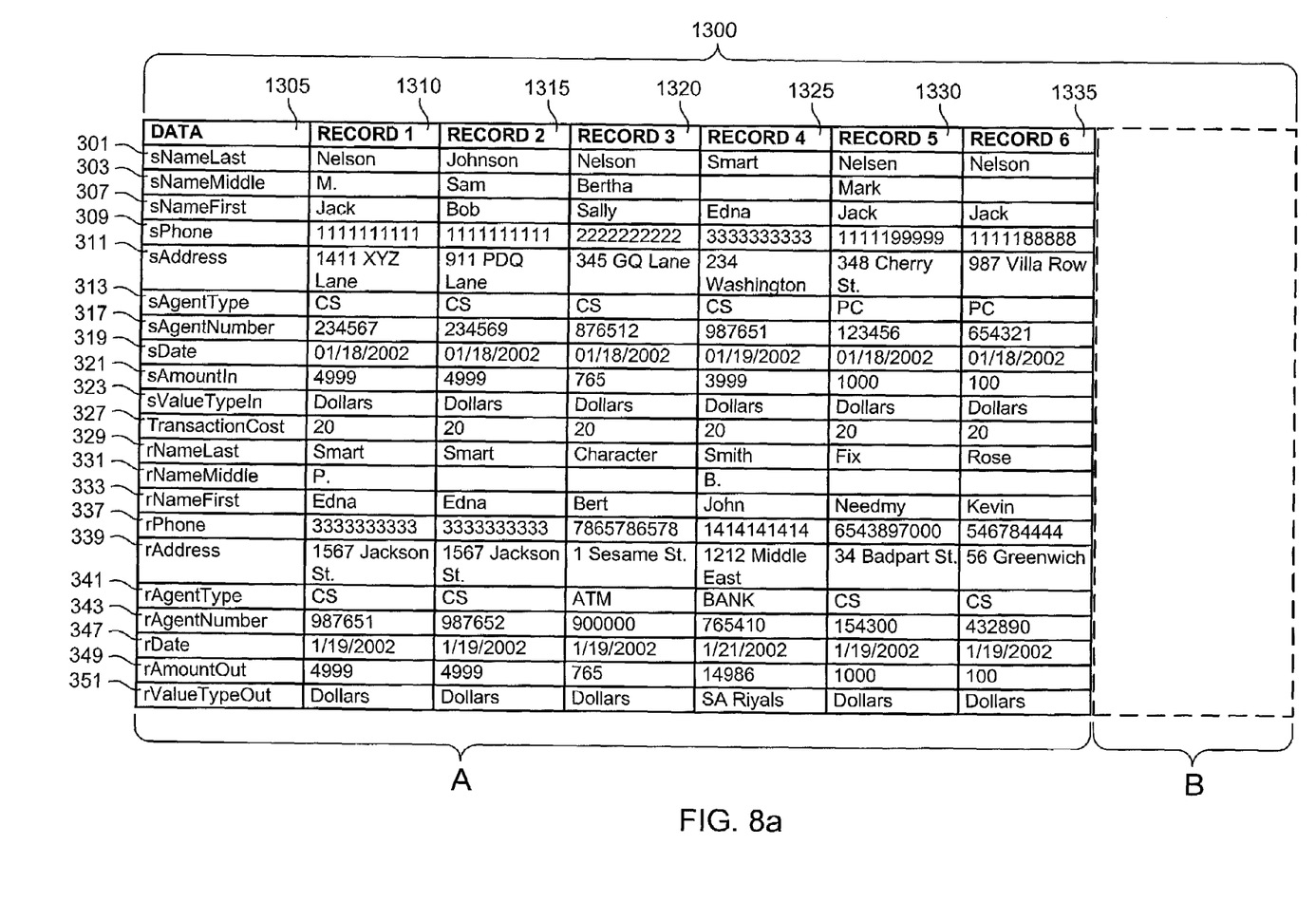
Figure 8B:
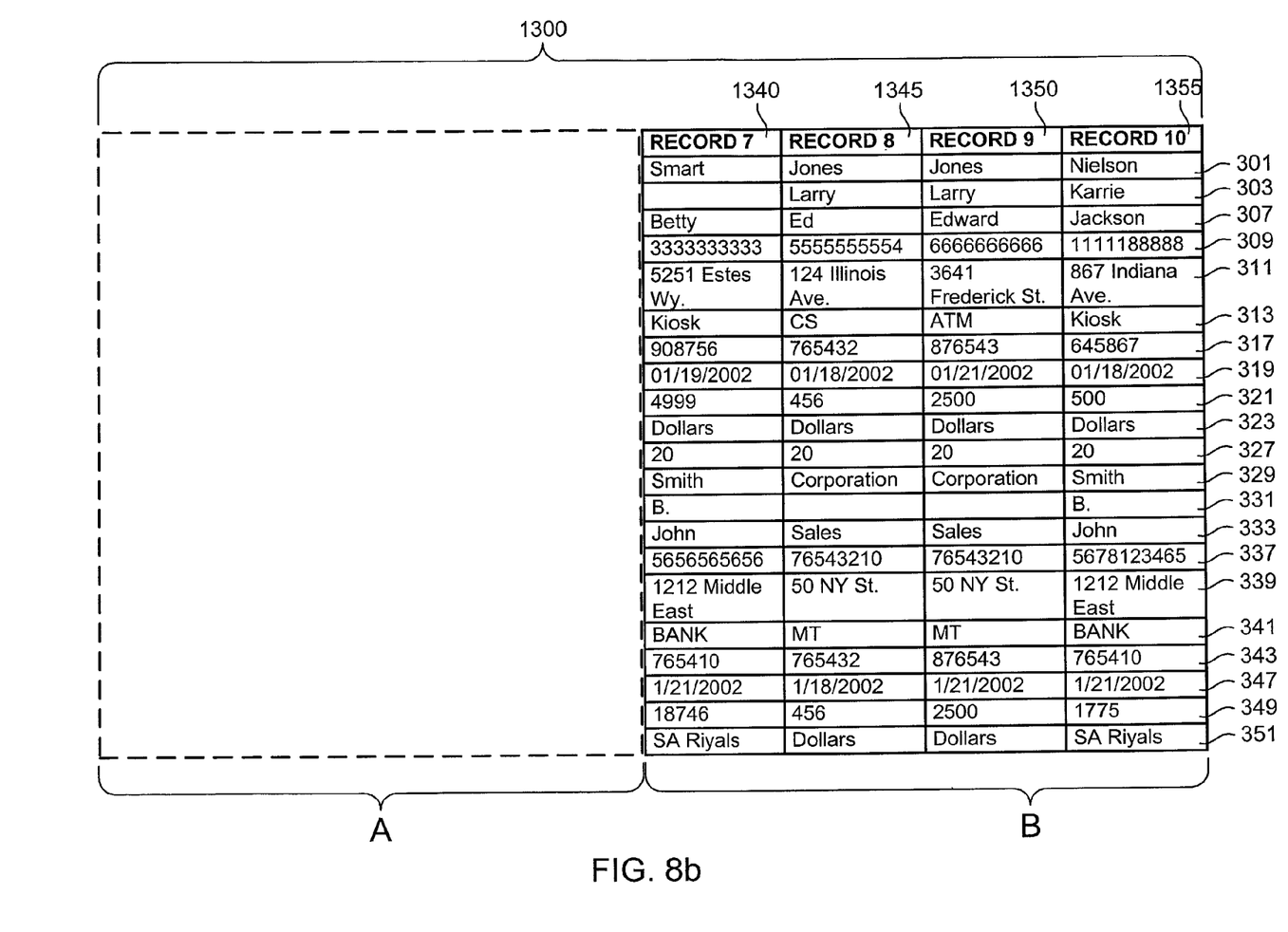

In some embodiments, transaction database 1136 maintains a record of money transfer activities associated with money transfer system 1100. An exemplary embodiment of such a record of money transfer activities 1300 is illustrated in FIGS. 8a-8b. Referring to FIG. 8a, record 1300 includes a schema 1305 outlining the type of data maintained for each money transfer transaction. The types of data can include: a sender's last name, sNameLast 301; a sender's middle name, sNameMiddle 1303; a sender's first name, sNameFirst 1307, a sender's phone number, sPhone 1309; a sender's address, sAddress 1311; the type of agent used by a sender, sAgentType 1313; the agent's identification number, sAgentNumber 1317; the date a transfer was requested, sDate 1319; the amount of the requested transfer, sAmountIn 1321; the type of value, sValueTypeIn 1323; the cost of the transfer, sTransactionCost 1327; a receiver's last name, rNameLast 1329; a receiver's middle name, rNameMiddle 1331; a receiver's first name, rNameFirst 1333, a receiver's phone number, rPhone 1337; a receiver's address, rAddress 1339; the type of agent used by the receiver, rAgentType 1341; the agent's identification number, rAgentNumber 1343; the date a transfer was received, rDate 1347; the amount of the received transfer, rAmountOut 1349; and the type of value received, rValueTypeOut 1351. It should be recognized that, within the scope of the present invention, any number of data types can be included in record 1300.

Figure 9:
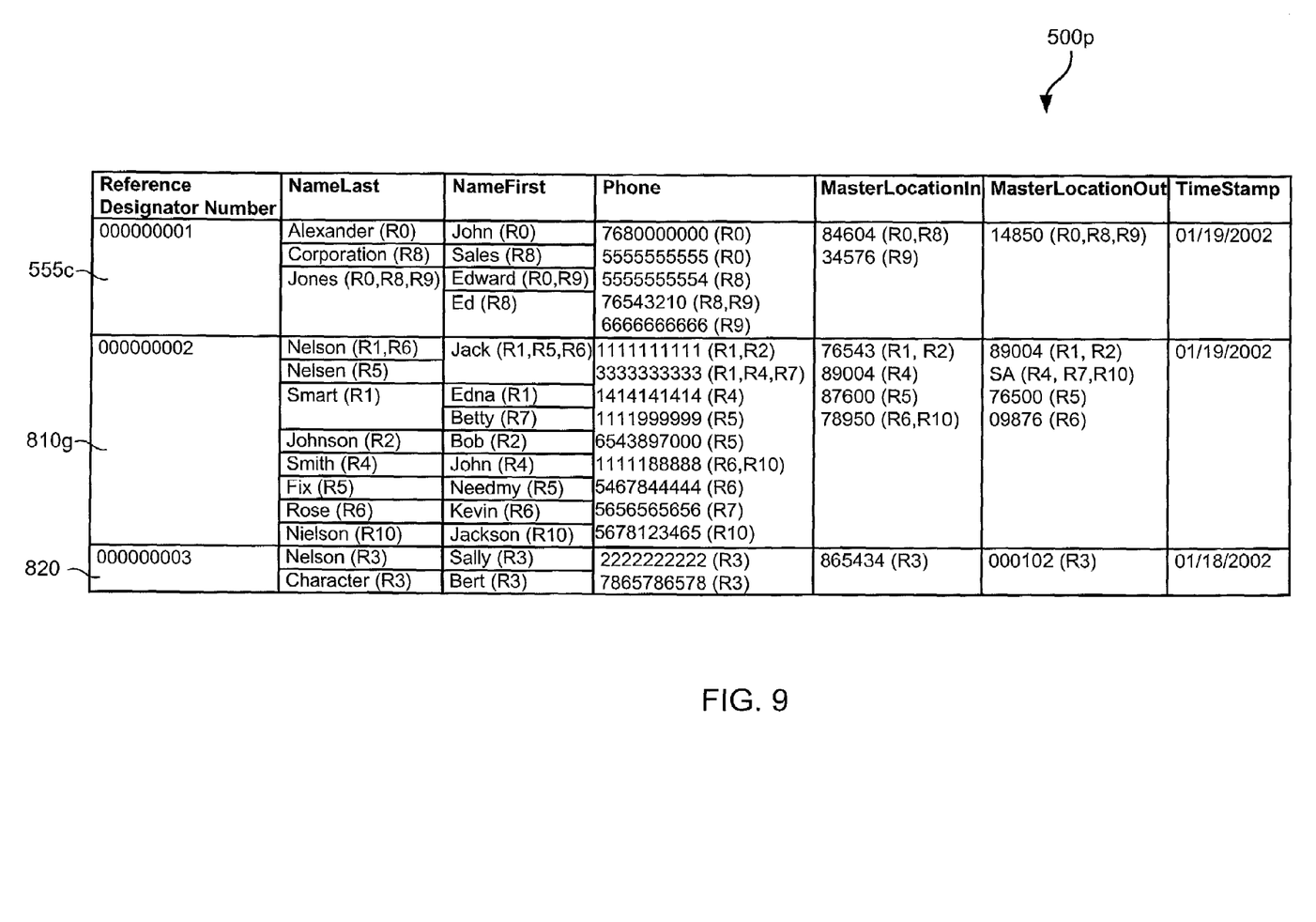
FIG. 9 illustrates and exemplary reference designator list in accordance with embodiments of the present invention.

As illustrated in FIGS. 8*a*-8*b*, record 1300 further includes a number of specific instances 1310, 315, 1320, 1325, 1330, 1335, 1340, 1345, 1350, 1355 of schema 1305. As described in detail in U.S. parent application Ser. No. 10/091,000 entitled Money Transfer Evaluation Systems and Methods, previously incorporated by reference for all purposes; the various instances in record 1300 can be analyzed, and based on the analysis a record designator list 1500 as illustrated in FIG. 9 can be developed Reference designator list 1500 can be used to analyze transactions as discussed in the previously referenced patent application. For example, reference designator list 1500 can be used is used in relation with database management tools to access various money transfer records within transaction database 1136 that, based on the reference designators, appear to be suspect.

In accordance with embodiments of the present invention, reference designator list 1500 can also be used in relation with fraud warning system 100 to detect fraudulent authorization requests. More particularly, reference designator list 1500 can be accessed by fraud warning system 100, and utilized in relation to methods previously described with reference to FIGS. 2-3. For example, in block S204, the tests run in investigation area 108 can include comparing the determined originating telephone number with the various telephone numbers provided in reference designator list 1500. If a match is found, additional investigation may be performed, or, in some instances, the authorization may simply be denied because it is associated with a cluster of inter-related activities that appear suspicious.

In various embodiments of the present invention, phone numbers identified as suspicious in fraud warning system 100 are incorporated into reference designator list 1500. Thus, for example, where a telephone number identified on fraud warning system 100 is not already associated with a reference designator within reference designator list 1500, a new reference designator is created, associated with the telephone number received from fraud warning system 100, and added to reference designator list 1500. Thus, when reference designator list 1500 is used in relation to either fraud warning system 100 or money transfer system 1100, indicators of fraudulent activity from both systems is available for use in detecting suspicious activity.

At this juncture, it should be recognized that information from a variety of fraud detection systems can be incorporated into a reference designator list to provide a comprehensive approach to fraud detection. Furthermore, the types of data shared between detection systems is not limited to telephone numbers, or even the information illustrated in reference designator list 1500. For example, fraud warning system 100 can additionally provide credit card numbers that are suspicious, names of suspicious users, and other relevant information. Yet further, other fraud detection systems may provide additional information that is unique to the particular fraud detection scheme yet warrants inclusion in a common reference designator list.

The invention has now been described in detail for purposes of clarity and understanding. However, it will be appreciated that certain changes and modifications may be practiced within the scope of the appended claims. Thus, although the invention is described with reference to specific embodiments and figures thereof, the embodiments and figures are merely illustrative, and not limiting of the invention. Rather, the scope of the invention is to be determined solely by the appended claims

What is claimed is:

1. A method for evaluating transactions for suspicious activity, the method comprising:
   providing a reference designator list, wherein the reference designator list includes at least a subset of information available from a first transaction system that is associated with suspicious activity, wherein the first transaction system comprises a money transfer network, and wherein the suspicious activity is related to suspect persons performing money transfers;
   evaluating a first money transfer transaction associated with the first transaction system using the reference designator list to detect suspicious activity, wherein the evaluating step comprises comparing transaction details associated with the first money transfer transaction with the reference designator list to determine any matching data;
   if matching data is found, flagging the first transaction as potentially involving an attempt by a suspect person to perform a money transfer, and updating the reference designator list with the matching data to produce an updated reference designator list;
   evaluating a second transaction associated with a second transaction system using the reference designator list to detect suspicious activity, wherein the second transaction system comprises a credit card network and wherein the evaluating step comprises comparing credit card transaction data from the second transaction with the updated reference designator list to determine any matching data; and
   if any matching data from the updated reference designator list is found, flagging the second transaction as potentially involving an attempt by an unauthorized person to charge a credit card account.

2. The method of claim 1, wherein the subset of information is a first subset of information, the method further comprising:
   receiving a second subset of information from the second transaction system; and
   incorporating the second subset of information into the reference designator list.

3. The method of claim 2, the method further comprising:
   receiving a third subset of information from the first transaction system; and
   incorporating the third subset of information into the reference designator list.

4. The method of claim 2, wherein the incorporating the second subset of information into the reference designator list comprises:
   creating a new reference designator;
   associating the second subset of information with the new reference designator; and
   adding the new reference designator to the reference designator list.

5. The method of claim 3, wherein the second subset of information comprises a telephone number.

6. The method of claim 3, wherein the second subset of information comprises a credit card number.

7. The method of claim 3, wherein the second subset of information comprises a name.

8. The method of claim 3, wherein the second subset of information comprises an address.

9. The method of claim 1, wherein the second transaction system is a system for analyzing authorization requests, and wherein the authorization request is received via a telephone call.

10. The method of claim 1, wherein the second transaction system:
- receives an authorization request at a receiving center, wherein the authorization request is associated with a request to charge a credit account;
- determining an origin of the authorization request; and
- comparing the origin of the authorization request with the information point in the reference designator list.

11. The method of claim 1, wherein the first transaction system:
- receives an authorization request at a receiving center, wherein the authorization request is associated with a request to charge a credit account;
- determining an origin of the authorization request;
- investigating the origin of the authorization request, wherein it is determined that the authorization request is suspicious; and
- providing the origin of the authorization, wherein the origin of the authorization comprises at least a portion of the subset of information and is incorporated into the reference designator list.

12. The method of claim 11, wherein the origin of the authorization request is a telephone number associated with a location from which the authorization request is initiated.

* * * * *